United States Patent [19]

Guhl et al.

[11] 4,427,709
[45] Jan. 24, 1984

[54] POWDERED CHEESECAKE MIX

[75] Inventors: Thomas E. Guhl, Jamesburg; Ralph E. Kenyon, Belle Mead; Patricia A. Mozeke, Plainsboro, all of N.J.

[73] Assignee: General Foods Corporation, White Plains, N.Y.

[21] Appl. No.: 307,353

[22] Filed: Sep. 30, 1981

[51] Int. Cl.³ .................... A23L 1/187; A23L 1/195
[52] U.S. Cl. .................................. 426/578; 426/573; 426/579; 426/582
[58] Field of Search .............. 426/555, 578, 579, 582, 426/573

[56] References Cited

U.S. PATENT DOCUMENTS

| | | | |
|---|---|---|---|
| 2,913,342 | 11/1959 | Cameron et al. | 426/582 |
| 3,098,748 | 7/1963 | Noznick et al. | 426/582 |
| 3,295,986 | 1/1967 | Saslaw et al. | 426/582 |
| 3,434,848 | 3/1969 | Katz | 426/582 |
| 3,666,493 | 5/1972 | Bluemke | 426/582 |

OTHER PUBLICATIONS

Tressler et al., Food Products Formulary vol. 2, Westport, Conn., Avi Pub. Co. Inc. 1975, pp. 75 and 76.

*Primary Examiner*—Raymond N. Jones
*Assistant Examiner*—Elizabeth A. Hatcher
*Attorney, Agent, or Firm*—Thomas R. Savoie; Daniel J. Donovan

[57] ABSTRACT

A powdered cheesecake mix is formulated with sugar, cheese, non-fat milk solids, fat, pregelatinized amylose-containing starch, gelling agents and a sufficient level of fatty acid mono and/or diesters of propylene glycol or glycol to shorten the sling texture otherwise produced, in the prepared cheesecake, by the amylose-containing starch.

4 Claims, No Drawings

POWDERED CHEESECAKE MIX

TECHNICAL FIELD

This invention relates to a dry, powdered mix which can be easily hydrated to provide a cheese cake filling that does not require baking. Such a mix is usually marketed with a separately packaged granular material, such as graham cracker crumbs, suitable for producing a no-bake crust to hold the filling. There are at present commercially-available dry mixes for preparing no-bake cheesecake fillings. One of these mixes contains sugar, powdered cheese, powdered fat, emulsifier (0.07% triglycerol monostearate), pregelatinized tapioca starch, phosphate gelling agents and flavoring and color agents. These mixes are suitable for being blended with milk to form a filling and thereafter poured into a crust where it will set after a short period of time (e.g., about an hour) to a texture somewhat like that of a baked cheesecake. It has been found however that the texture of these prior no-bake cheesecakes is a bit slimy or mucid (i.e. pudding-like) and not fully comparable to the short, drier texture of home-baked cheesecake. It would be desirable therefore to produce a no-bake cheesecake filling which more closely resembles the texture of baked cheesecakes.

DISCLOSURE OF THE INVENTION

It has been found that the presence of tapioca starch which contains a relavitely high level (typically about 17% by weight) of amylose is a prime factor leading to the slimy texture of no-bake cheesecake formulations. It has been demonstrated that the presence of as little as 175 ppm (parts per million, dry weight basis) of amylose is the threshold level to produce a slimy cheesecake texture. However, because of its clean taste, minimal flavor masking effects and relatively low cost, tapioca starch is a preferred starch component in powdered cheesecake mixes. The present invention provides a means for correcting the negative effects of tapioca starch on the texture of no-bake cheesecakes.

Although it is not wished to be limited to such, it has been theorized the amylose present in tapioca starch (normally about 17% amylose and 83% amylopectin) forms a long unabbreviated helical structure by hydrogen bonding to itself and that it is this long helical structure which produces the slimy or pudding-like texture. Amylopectin, a highly-branched molecule, which is the predominant polysaccharide in most non-waxy starches, does not produce a helical structure. Fatty acid mono and diesters of propylene glycol or glycerol have been found to form colorless channel-type inclusion compounds with amylose that are structurally similar to the well-known iodine-amylose complex. It is believed that the acid end of the glycol or glycerol ester inserts itself into the helical structure thereby abbreviating the helical structure. Monostearate esters of propylene glycol and glycerol are the prefered materials for use in this invention. According to this invention the fatty acid ester or combination of esters is included in the cheese cake formulation in an amount which is at least 25%, preferably 50% by weight of the amylose present in the formulation.

As the dry cheesecake formulation contains an amount of a fat, typically from about 8–15% by weight, an emulsifier must also be present. According to this invention the fatty acid mono and diesters of propylene glycol or glycerol which are critical to abbreviating the helical amylose structure also function as an emulsifying agent for the fat. If desired additional emulsifying agents may be included.

The fat, which preferably is a hydrogenated vegetable oil, is typically incorporated into the formulation as small particles of fat encapsulated in a coating of edible, water-soluble solids. A more detailed description of the components and process for a powdered fat composition may be found in commonly-assigned U.S. Pat. No. 2,913,342 to Cameron which is hereby incorporated by reference. Some and typically all of the emulsifiers present in the cheesecake mix will be incorporated in the powdered fat component.

If it is desired to formulate a powdered cheese cake mix which is capable of yielding a no-bake cheese cake having a relatively light fluffy texture, propylene glycol monostearate (PGMS) is the required emulsifier. PGMS, because it contains only one hydroxyl group, forms hydrophobic bonds with fat such that a network of fat, capable of entrapping air is formed. Entrapping air within the cheesecake filling has the desirable effect of yielding a texture which more closely simulates the texture of home baked cheesecake. The drying effect results from the fact that an expanded product, containing a constant amount of total moisture, will be perceived organoleptically as having a reduced moisture content as compared to its unexpanded counterpart. It should be noted that some diester will be contained in commercially-available PGMS, but in keeping with common practice the mixture of mono and diesters will be referred to as PGMS.

It has been found that the use of PGMS at a level of 0.4% to 1.0% by weight of the dry mix gives a product which would allow the consumer to have either a light or dense cheesecake, depending upon the mixer speed which is used to prepare the filling from the dry mix. Thus, by marketing only one formulation, the consumer is presented with the opportunity of making cheesecakes having differing textures. Normally this would require separate formulas or additional ingredients being added by the consumer.

An emulsifier such as triglycerol monostearate, which contains at least five hydroxyl groups, is not capable of forming strong hydrophopic bonds and will not produce a fat network which will hold air.

Other functional ingredients contemplated for use in this invention are materials well-known to those skilled in the dessert art as will be apparent from the following discussion. Unless otherwise indicated all percentages are weight percentages.

Sweetening agents will be included in the cheesecake formulation for both flavor and bulking purposes and will typically be present at a level of from 25 to 60%, preferably from 35 to 55%. Sucrose is the preferred sweetener but other sugars such as dextrose, fructose, corn syrup solids or non-nutrutive sweeteners such as saccahrin, cyclamates or aspartame in combination with a bulking agent such as dextrins, polyols, etc. may be utilized.

Powdered cheese such as farmers cheese, cottage cheese, etc. will be present in the formulation at a level of from about 10 to 35% of the formulation. The powdered cheeses serves as a bulking agent as well as contributing flavor to the formulation.

Milk solids such as buttermilk solids, skim-milk solids, non-fat dry milk solids, sodium casienate will be present at a level of from about 5 to 15%. These milk solids also function as both bulking agents and flavor-imparting agents.

Fat, typically a hydrogenated vegetable oil such as palm kernel oil, coconut oil, cottonseed oil and the like is present in the cheesecake mix at a level of from 8 to 25%. The fat component will usually be incorporated into the mix in the form of one or more powdered fat compositions which will contain from about 20% to about 70% fat.

Pregelatinized tapioca starch is included in the formulation of this invention at a level of from about 3 to 8%. This amount of tapioca starch will typically provide about 0.05 to 1.4% of amylose to the dry cheesecake formulation. This amount of amylose will adversely affect the texture of the finished cheesecake product, unless corrective measures, such as the technique which constitutes the basis of this invention, are employed.

As the cheesecake formulation of this invention is designed to be mixed with milk and cold set, setting or gelling agents must be included in the formulation. Any conventional gelling agents may be used, the level of these materials typically being from about 0.05 to 3%. The preferred gelling system includes phosphate salts which will react with the milk proteins (e.g. sodium casienate) to form a desirable gel. A combination of a sodium orthophosphate, such as mono-, di- or trisodium phosphate, and a sodium pyrophosphate, such as sodium acid pyrophosphate or tetrasodium pyrophosphate, will be employed in the gelling system.

Various other functional ingredients, such as flavoring agents, coloring agents, buffering agents, may also be included in the formulations of this invention, in a manner well-known to those skilled in the art.

This invention further described with reference to the following comparative example wherein the quality and functionality of a commercial cheesecake formulation (Formula A) is significantly improved by following the teachings of this invention.

EXAMPLE

| Ingredient | Formula A (weight %) | Formula B (weight %) |
|---|---|---|
| Sucrose | 43.4 | 43.7 |
| Spray Dried Cheese | 23.7 | 20.6 |
| Spray Dried Fat | 14.2* | 18.5** |
| Spray Dried Buttermilk | 11.9 | 10.3 |
| Pregelatinized Tapioca Starch | 4.7 | 4.9 |
| Sodium Phosphates | 1.7 | 1.4 |
| Flavor and Color Agents | 0.4 | 0.5 |
| *Spray Dried Fat | | |
| High Lauric Vegetable Fat (w/0.02% BHA) | 61.5% | |
| Carbohydrate Encapsulating Agents | 34.5 | |
| Protein Encapsulating Agents | 3.5 | |
| Triglycerol Monstearate | 0.5 | |
| | 100.0% | |
| **Spray Dried Fat | | |
| High Lauric Vegetable Fat (w/0.02% BHA) | 47.8 | |
| Hydrogenated Palm Kernal Oil | 7.8 | |
| Carbohydrate Encapsulating Agents | 36.2 | |
| Protein Encapsulating Agents | 4.1 | |
| PGMS (approx. 45% mono-esters) | 3.3 | |
| Triglycerol Monstearate | 0.4 | |
| Hydroxylated Lecithin | 0.2 | |
| Acetylated Monoglyceride | 0.2 | |
| | 100.0% | |

Formulas A and B represent two different cheesecake fillings which are each mixed with 1.5 cups of cold milk in a home mixer until a uniformly thick composition is obtained. The fillings, each having a comparable overrun, are then poured into preformed graham cracker crumb crusts and chilled for several hours. Each of these cheesecake formulations was compared by consumers against a third formulation which was another commercially-available no-bake cheesecake product.[1] Testing amoung 240 consumers showed that the Formula A cheesecake was less preferred (43% to 53%) than the third formulation which was designated by the consumers as being preferred in several major areas including: overall appearance and texture of filling. Testing among 265 consumers, however, showed that the Formula B cheesecake was preferred (58% to 42) to the third formulation. In a test among 580 consumers Formula B cheesecake was preferred to Formula A cheesecake 60% to 40%. All those consumer tests preferences were statistically significant at better than a 95% confidence level.

| [1]Approximate formulation of dry filling: | |
|---|---|
| | (Weight %) |
| Sugar | 40.9 |
| Buttermilk Solids | 19.0 |
| Skim Milk Solids | 14.2 |
| Cheddar Cheese | 9.5 |
| Spray Dried Fat | 9.5 |
| Modified Food Starch | 4.8 |
| Phosphate Gelling Agents | 1.4 |
| Flavor & Color Agents | 0.6 |
| Sodium Silico Aluminate | 0.2 |

Having thus described the invention what is claimed is:

1. A dry, hydratable cheesecake mix which when combined with milk and mixed at a low mixer speed will yield a short, dense texture and when mixed a high mixer speed will yield a short, light texture, said dry mix containing flavor and bulking agents, powdered cheese, powdered fat, pregelatinized, amylose-containing starch, and phosphate gelling agents, said mix having a fat content of from 8% to 25% by weight and an amylose content of from 0.05% to 1.4% by weight and wherein said mix further contains propylene glycol monostearate at a level of 0.4% to 1.0% by weight and in an amount which is effective to shorten the slimy texture produced by the amylose and which amount is at least 15% by weight of the amylose present in the mix.

2. The product of claim 1 wherein the fat content of the dry mix is from 10% to 15%.

3. The product of claim 1 wherein all of the starch contained in the mix is amylose-containing starch.

4. The product of claim 3 wherein the amylose-containing starch consists of tapioca starch.

* * * * *